Oct. 5, 1926.

G. C. DRAKE 1,602,003

GUARD ATTACHMENT FOR WINDSHIELDS

Filed April 24, 1923

Inventor
G. C. Drake.

Patented Oct. 5, 1926.

1,602,003

UNITED STATES PATENT OFFICE.

GUY C. DRAKE, OF PONCA CITY, OKLAHOMA.

GUARD ATTACHMENT FOR WINDSHIELDS.

Application filed April 24, 1923. Serial No. 634,343.

This invention relates to improvements in guard attachments for windshields of motor vehicles and motor boats.

An important object of the invention is the provision of a guard that may be disposed in the line of vision of the operator to protect the eyes of the latter from glaring light rays emanating from the headlights of approaching motor vehicles or from the glare of the sun, and further from other reflected light rays.

A further object is to provide a guard that will protect that portion of the windshield which is in close proximity thereto, from accumulation of snow or rain-drops which seriously impair the careful manipulation of a motor vehicle or motor boat during inclement weather.

Another object of the invention is the provision of a guard having improved operating means whereby it may be elevated or lowered as best suits the need of the operator of a motor vehicle or motor boat.

With the foregoing and other objects in view, the invention consists in the details of construction, and in the arrangement and combination of parts to be hrereinafter more fully set forth and claimed.

Figure 1:
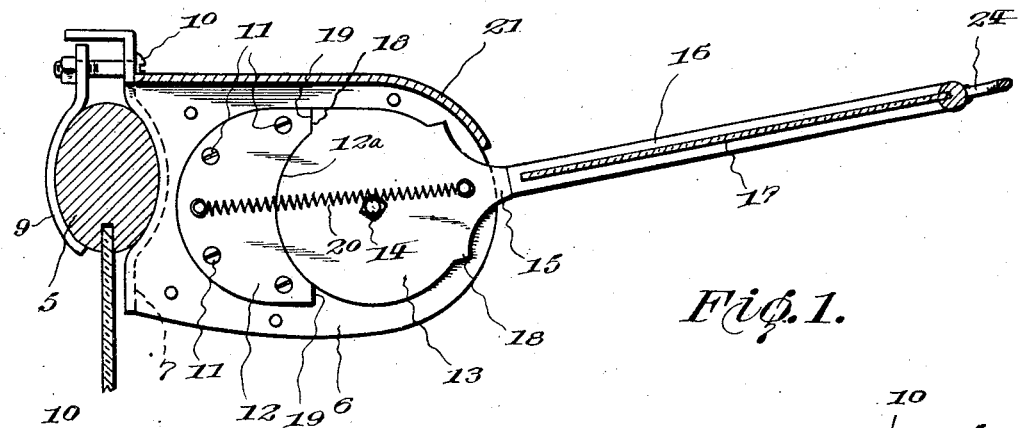
Figure 2:
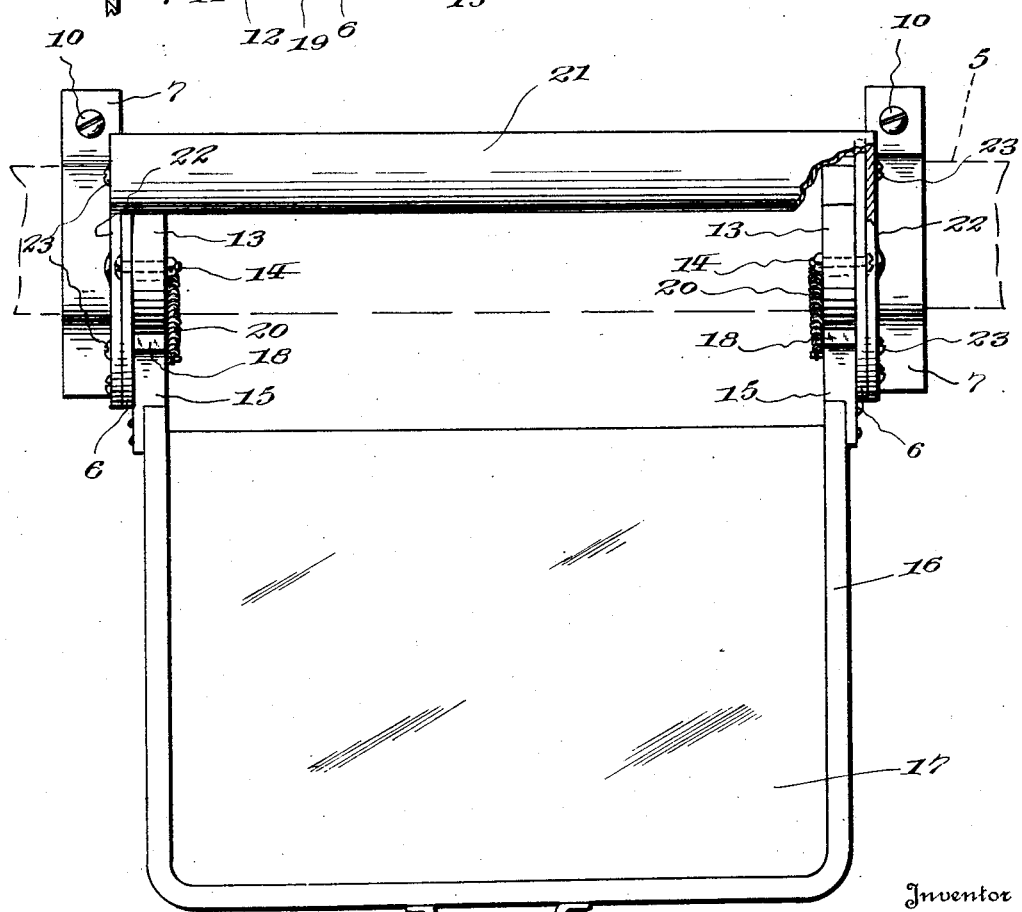

In describing the invention in detail, reference will be had to the accompanying drawing forming a part of this specification wherein like characters denote corresponding parts in the several views, and in which:

Figure 1 is a transverse section through the device showing its attaching means to the windshield of a motor vehicle, the guard being shown in its raised position, and Fig. 2 is a front elevation of the same showing the guard in lowered position.

Referring now particularly to the accompanying drawing, the numeral 5 denotes a windshield frame of a motor vehicle or motor boat.

My improved guard is secured to the said windshield frame 5 by means of forwardly extending brackets 6, 6, having lateral extensions 7 extending upwardly a short distance where they are bent inwardly over the top of the said windshield frame 5. On reference to Fig. 1, it will be noted that the lateral extensions 7 are bowed out slightly in the middle so as to conform to the contour of the windshield frame, and also that the clamping pieces 9 are similarly bowed, and secured to the lateral extensions 7 by means of screws 10. Supporting means for the guard is thus provided.

To the inner face of the bracket 6 is rigidly secured, as shown at 11, a disk 12 having its forward edge 12$^a$ concaved. Rotatably mounted in the concaved edge 12$^a$ of the said disk 12 is a substantially circular disk 13, which is pivoted, as shown at 14, and which is provided with a forwardly extending shank 15 to which latter is secured the frame 16 fitted with colored glass or other transparent medium 17. The rotatable disk 13 is provided with peripheral lugs 18 which coact with vertically flattened surfaces 19 of the said disk 12, serving as stops to limit the raised and lowered position of the said frame. In order to compensate for any wear of the pivoted point 14 of the disk 13 and to secure positive coaction between the latter and the disk 12, I provide a spring 20 having its ends anchored in the said disks 12 and 13.

Further, to protect the working parts of this device, I provide a housing 21 which has lateral extensions 22 suitably secured to the said bracket 6, as indicated at 23. The housing extends downwardly a short distance from its top, it being here cut away so as not to interfere with the elevation of the frame.

The front member of the frame 16 is provided with a handle 24 to more conveniently adjust the frame.

On reference to Fig. 1, showing the raised position of the frame, it will be noted that the top lug 18 now coacts with the flattened surface 19, of the disk 12 limiting the elevated position of the said frame. Likewise, the lowered position of the frame is limited by the coaction between the bottom lug 18 and the flattened surface 19 of the said disk 12.

In each instance whether the frame is raised or lowered, the spring 20 is, respectively above or below the pivotal point 14 of the said disk 13, sufficiently supporting the frame in either of its two positions.

Attention is especially directed to Fig. 1 which plainly illustrates that each spring 20 extends a substantial distance beyond the axis of the associated disk shaped heads 13 and therefore urges each disk shaped head into edge to edge contact with the associated plate 12. By reason of this construction and arrangement of parts the spring not only serves as a means to urge each disk shaped head to an extreme position, but also serves as a means to prevent rattle and accidental movement of the visor. More particularly the spring urges the edge of the disk shaped head 13 into engagement with the wall of the concave recess in the plate 21.

Furthermore each disk shaped head is secured flatly in contact with the bracket 6 and is therefore not likely to rattle. It will be seen also that each plate 12 is secured to the bracket at spaced points and therefore strengthens and reinforces the same and at the same time the plate is concealed from view.

While I have shown the preferred form of my invention, it is to be understood that it is susceptible to modification, and the embodiment hereinbefore set forth and shown in the drawings, is, therefore, to be considered as illustrative, rather than descriptive, of the scope of the invention.

Having thus described my invention, I claim as new and desire to secure by Letters Patent:

1. An automobile windshield visor comprising a hood having attaching brackets, a visor frame having end members provided with disk shaped heads rotatably connected to said brackets and being flatly in contact with the inner surfaces of the same, plates rigidly secured at spaced points to the inner surfaces of said brackets and having concave edges flatly engaged by the edges of said rotatably mounted disk shaped heads, said plates being provided at the ends of said recesses with contact shoulders and said heads being formed with shoulders adapted to contact with said first named shoulders to limit the rotation of the heads.

2. An automobile windshield visor comprising a hood having attaching brackets, a visor frame having end members provided with disk shaped heads rotatably connected to said brackets and being flatly in contact with the inner surfaces of the same, plates rigidly secured at spaced points to the inner surfaces of said brackets and having concave edges flatly engaged by the edges of said rotatably mounted disk shaped heads, said plates being provided at the ends of said recesses with contact shoulders, said heads being formed with shoulders adapted to contact with said first named shoulders to limit the rotation of the heads, and springs connected to said plates and to said heads for urging the heads to extreme positions.

3. The construction set forth in claim 2, each spring being extended a substantial distance beyond the axis of the associated head to urge the head into edge to edge contact with the associated plate.

In testimony whereof I affix my signature.

GUY C. DRAKE.